United States Patent [19]

Roberts

[11] 4,139,110
[45] Feb. 13, 1979

[54] BOAT LOADING AND UNLOADING DEVICE FOR AUTOMOTIVE VEHICLES

[76] Inventor: Herbert C. Roberts, Damascus, Dept. of State, Washington, D.C. 20520

[21] Appl. No.: 789,067

[22] Filed: Apr. 20, 1977

[51] Int. Cl.² .............................................. B60R 9/00
[52] U.S. Cl. ........................................ 214/450; 9/39; 224/42.1 H
[58] Field of Search .................. 214/450; 224/42.1 H; 9/30, 31, 34–40

[56] References Cited

U.S. PATENT DOCUMENTS

| 3,608,759 | 9/1971 | Spurgeon et al. ................... 214/450 |
| 3,615,030 | 10/1971 | Wuest et al. ......................... 214/450 |
| 3,671,986 | 6/1972 | Peters .......................................... 9/39 |

FOREIGN PATENT DOCUMENTS

| 1372578 | 8/1964 | France ..................................... 214/450 |
| 593307 | 10/1947 | United Kingdom .......................... 9/39 |

*Primary Examiner*—Robert G. Sheridan
*Assistant Examiner*—Ross Weaver

[57] ABSTRACT

This device consists primarily of a movable frame, mounted inside of a fixed frame on the top of a vehicle. The device includes two davit-like structures which connect to a rod having pulley and line means, which will enable the boat or other load to be handled easily by a single person.

4 Claims, 5 Drawing Figures

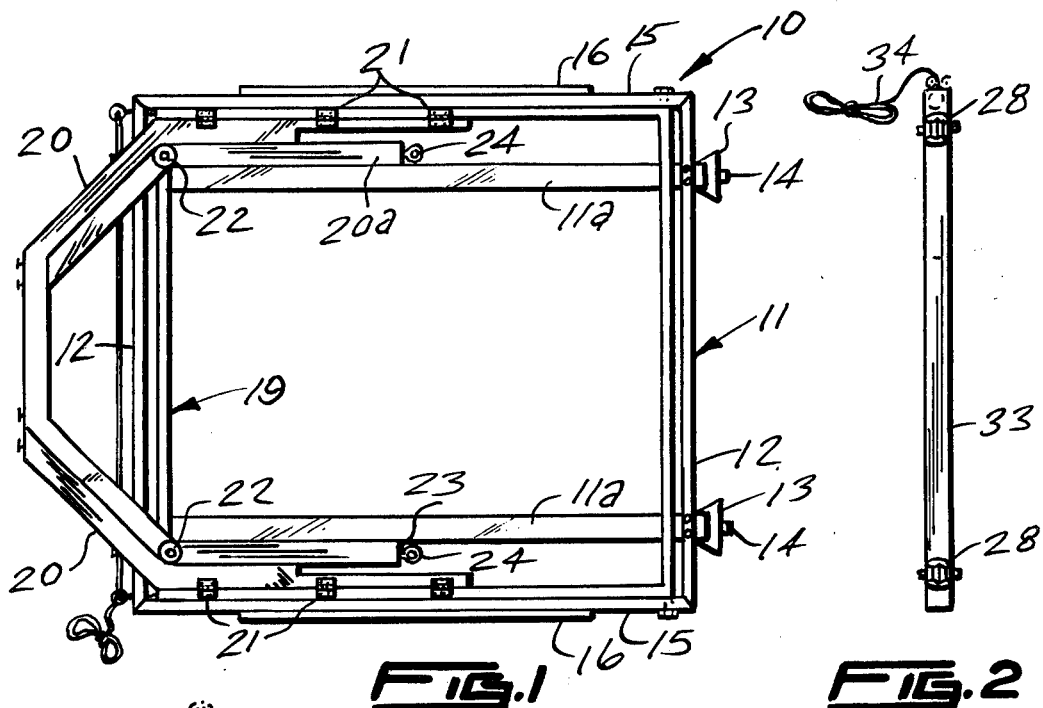
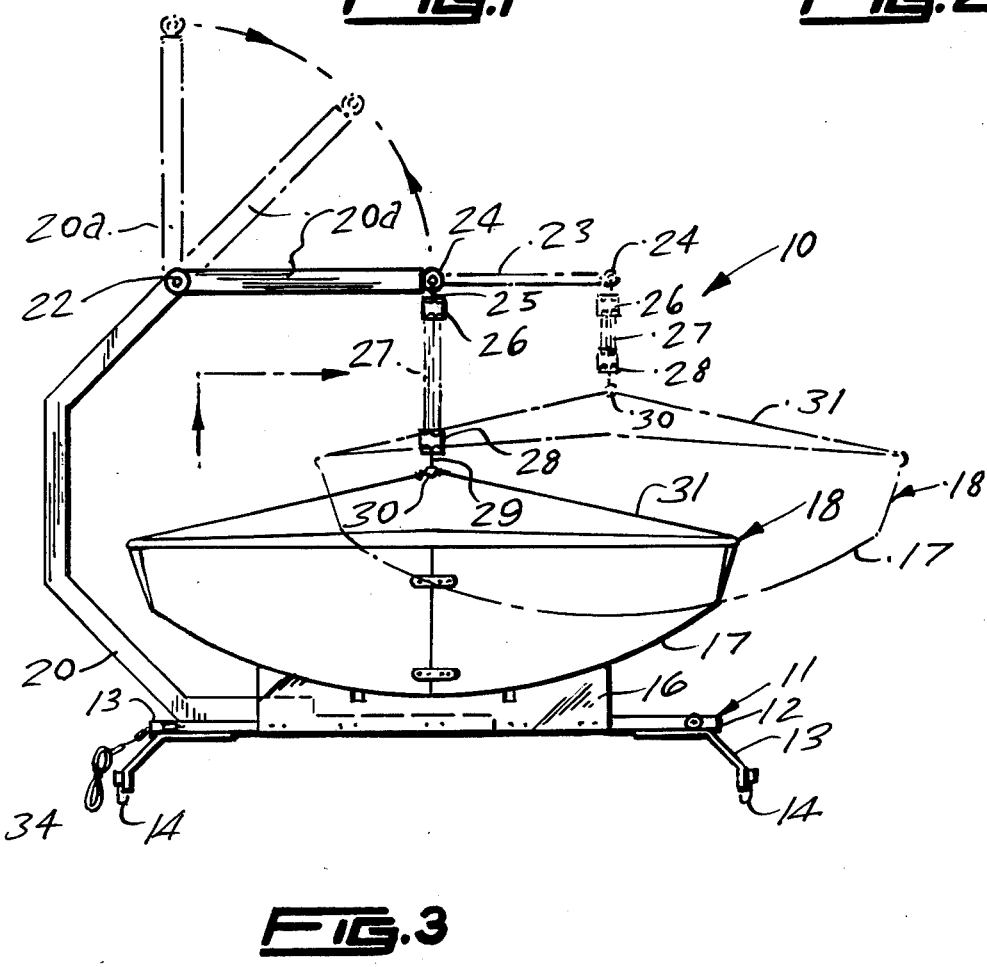

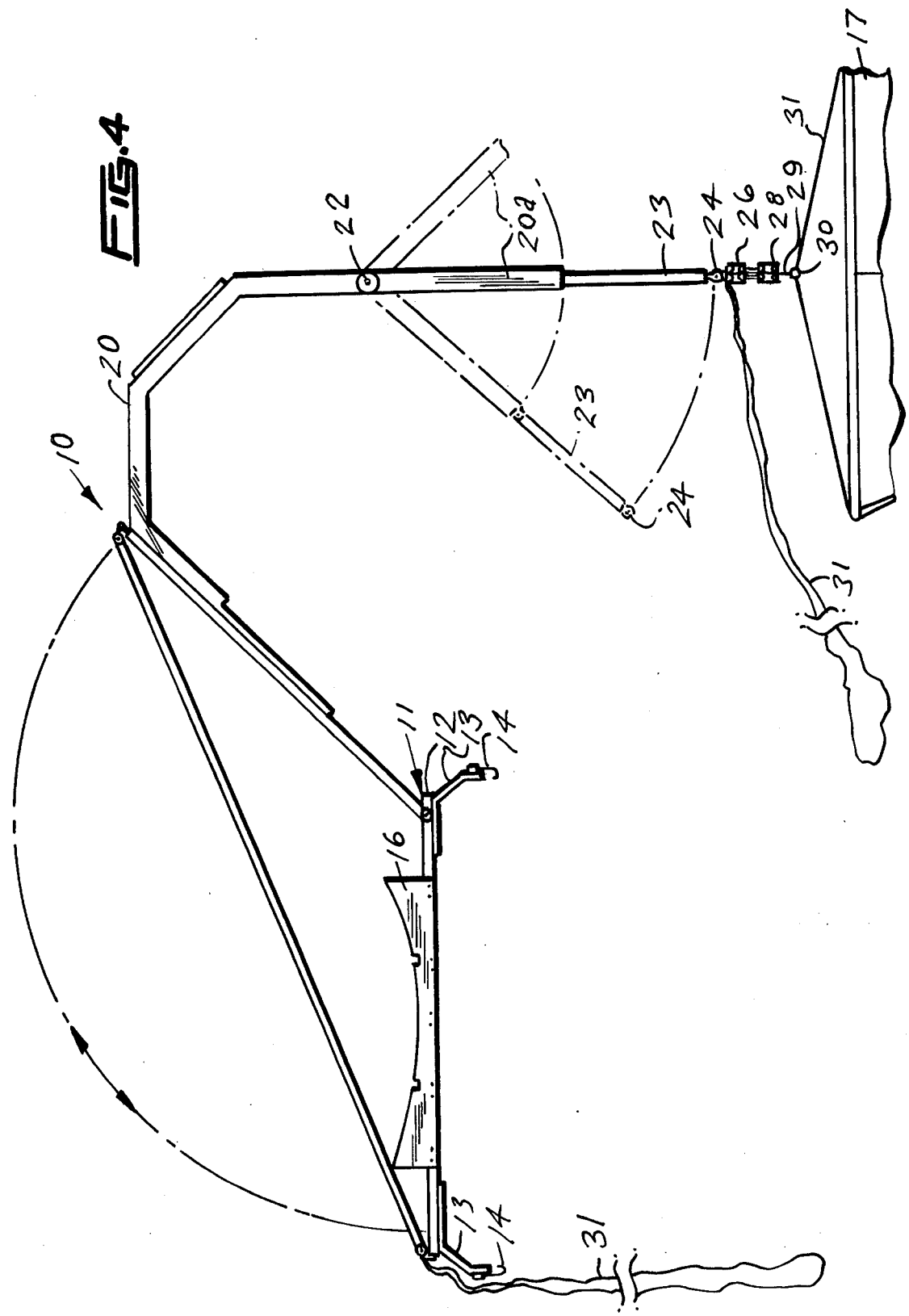

BOAT LOADING AND UNLOADING DEVICE FOR AUTOMOTIVE VEHICLES

This invention relates to vehicle accessories for boat handling, and, more particularly, to a boat loading and unloading device for automotive vehicles.

It is, therefore, the principal object of this invention to provide a boat loading and unloading device for automotive vehicles, which will be operated easily, by one person.

Another object of this invention is to provide a device, of the type described, which will be of such structure, that it will have a mechanical advantage inherent therein, in order that the boat or other load may be handled with very little effort by one person.

A further object of this invention is to provide a device, of the type described, which may be operated manually, or may be modified to employ motor means, which may be powered by the automotive vehicle battery.

Other objects of the invention are to provide a boat loading and unloading device for automotive vehicles, which is simple in design, inexpensive to manufacture, rugged in construction easy to use and efficient in operation.

These, and other objects, will be readily evident upon a study of the following specification, and the accompanying drawings, wherein:

FIG. 1 is a top plan view of the present invention;

FIG. 2 is a top view of a pulley arrangement of the device, shown in elevation;

FIG. 3 is an end view of the invention, shown from the rear of the vehicle, and illustrates the boat in phantom lines, as it is partially elevated; and FIG. 4 is similar to FIG. 3, but shows the boat extended from the vehicle, and lowered to the water or ground level.

Figure 5:
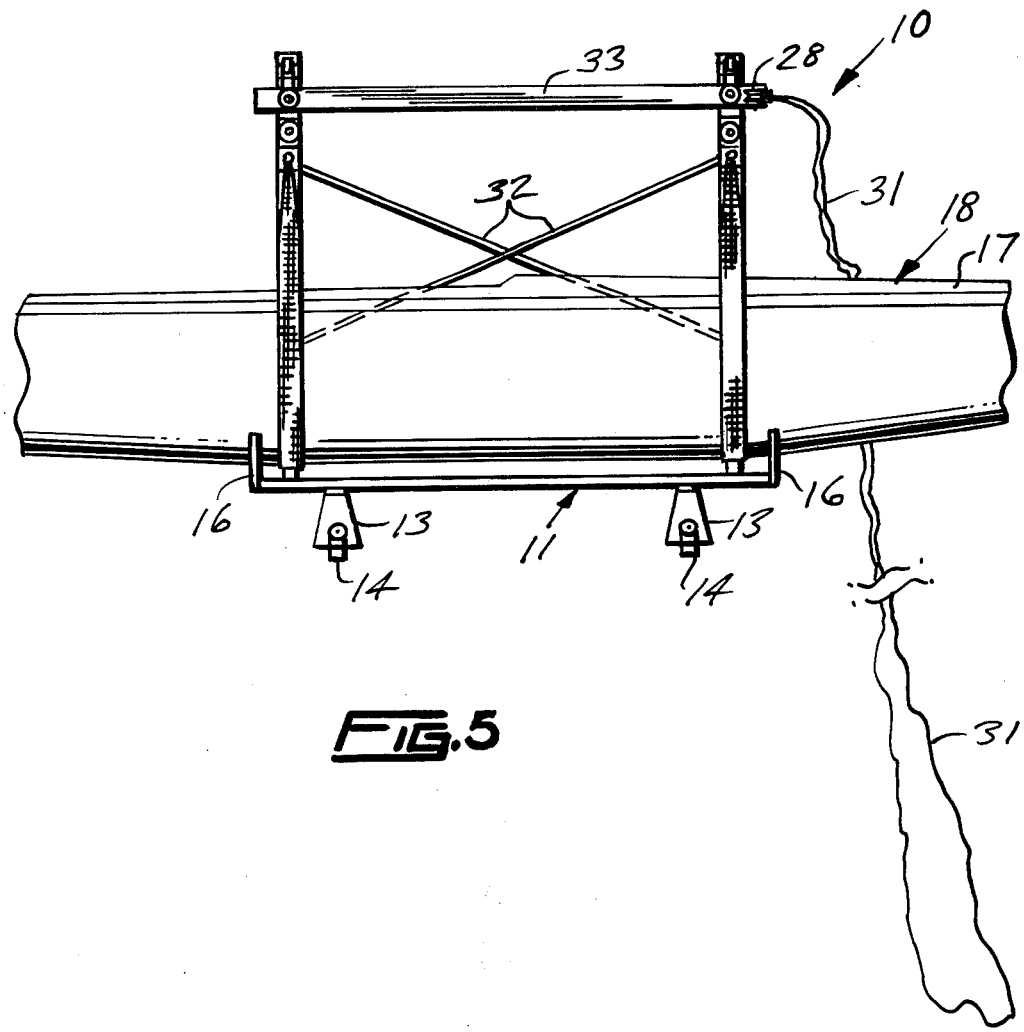
FIG. 5 is a side view of the invention with the davit-like structures raised.

According to this invention, a device 10 is shown to include a fixed rectangular frame 11, having, on opposite sides 12, a pair of spaced apart bracket arms 13, with hook means 14, for securement to the roof of a vehicle in a well known manner. Fixedly secured in a suitable manner to frame 11, on the front and rear ends 15, are cradle members 16, for receiving the hull 17 of the boat 18, or another article.

A movable frame 19 is mounted on the inside of fixed frame 11. Two lifting arms 20 are hinged to movable frame 19, by means of spaced apart hinges 21.

It shall be noted, that a pair of spaced apart cross members 11a are fixedly secured, in a suitable manner, to the interior of fixed frame 11, so as to impart rigidity thereto.

Lifting arms 20 are provided with a pivotable extension 20a, one each, which is secured thereto by pivot pin 22. Telescopingly received within extensions 20a is a rod 23, having its end terminated by an eye 24, which received the hook 25 of pulley 26. The line of pulley 26 is in engagement with pulley 28, which, by hook 29 means, receives eye 30 of two straps 35 which support the hull, when it is being raised or lowered. The hooks 29 may be used to engage and disengage with suitable cleat hooks (not shown) on the hull 17, if desired. The cross braces 32, of the assembly, provide the necessary rigidity means for the side portions of device 10, and the rod 33, which is similar in operation to the top part of a venetian blind, is attached to the lifting arms 20, when they are raised. Two hooks drop from a line 31, which is strung through the rod 33 with pulleys 28, and attach to the companion or cleat hooks built into the boat 18, or into hooks attached to canvas straps 31, which go around boat 18. Line 31, which goes through rod 33, controls vertical movement of the boat.

It shall further be noted that, for additional holding power an added hook, which fits between the car door and the car, may be used in order to make sure the device 10 does not break loose on the drivers side of the vehicle, when the arms 20 are extended, and the boat 18 is lowered over the side of the vehicle.

It shall even further be noted, that this device 10 is adaptable for use with various sizes of pulleys, jamming devices, and cam cleats.

Upon arrival at the water or unloading area, the boat 18 is untied from the device 10, and raised several inches, in order that it clears the form-fitting cradles 16. The boat 18 is then pushed outwards, towards the passengers side, as shown in FIGS. 3 and 4 of the drawings. Sliding the boat 18 outward on the extensions 20a, moves the center of gravity from the middle of the vehicle, to the side, so that the movable frame 19 can be tilted upward, as shown in FIG. 4. The line 34, attached to both the fixed frame 11, and the movable frame 19, controls the rotation of the movable frame 19, until the boat 18 is hanging well over the side of the vehicle.

Once the boat 18 is over the side, the other line 31, which is strung through the rod 33 and pulley 28 arrangement, is released, and the boat 18 is lowered to the desired location. The reverse procedure is followed, to raise and position the boat 18 on top of the vehicle. If the boat 18 is to be suspended from the ceiling of a garage, the pivotable portion 20a of lifting arms 20 are raised, in order that the boat 18 will clear the device 10, when it is pulled up.

While various changes may be made in the detail construction, it is understood that such changes will be within the spirit and scope of the present invention, as is defined by the appended claims.

What I now claim is:

1. A Boat Loading and Unloading Device for Automotive Vehicles, comprising, in combination, a hollow rectangular and fixed frame mounted to a top of a vehicle, a pair of spaced-apart and contoured cradles secured to said fixed frame for removably receiving a hull of a boat, a movable frame and a pair of hinged lifting arms secured to said movable frame, each said lifting arm having a telescoping extension, the extensible portion of which carries a line and pulley means for raising and lowering said boat, and said movable frame comprising an inner frame of hollow rectangular configuration which is received within said fixed frame to move said boat to and away from a longitudinal axis of said vehicle.

2. The combination according to claim 1, wherein said fixed frame includes a plurality of spaced apart bracket arms with hook means for rendering it secure to the said vehicle, and said bracket arms are fixedly secured, a pair each, to the sides of said fixed frame, and said lifting arms are secured by a plurality of hinges, to said movable frame, said arms being pivotable upwards and downwards of said movable frame.

3. The combination as set forth in claim 2, wherein the free ends of said arms are each pivotally secured by pin means to said telescoping extensions, the extendable portion of each said extension having an eye receiving a hook on a rod which contains a pulley arrangement with further hooks for being removably secured to said boat, said telescoping extensions providing a lateral extending means for moving said boat to one side of a vehicle longitudinal axis, and said pulley arrangement providing mechanical advantage means for enabling said boat to be raised and lowered to and from said vehicle by a single operator, the extendable portion of said lifting arms shifting the center of gravity of the boat relative to said fixed frame to easily rotate said movable frame and thus move said boat laterally.

4. The combination as set forth in claim 3, wherein said lifting arms are of semi-"V" shaped configuration, so as to freely receive, on their interior contour, a longitudinal side periphery of said boat, and are pivoted so as to enable said boat to be raised above said device, in order to enable storage thereof in a suspended position.

* * * * *